United States Patent [19]

Koziol

[11] Patent Number: 5,468,142
[45] Date of Patent: Nov. 21, 1995

[54] GAS LIGHT CONTROL APPARATUS

[75] Inventor: Walter Koziol, Antioch, Ill.

[73] Assignee: Modern Home Products Corp., Antoich, Ill.

[21] Appl. No.: 193,315

[22] Filed: Feb. 8, 1994

[51] Int. Cl.⁶ ..................................... F23Q 9/14
[52] U.S. Cl. ................ 431/18; 431/6; 431/100;
431/255; 137/78.4; 251/117; 251/129.14;
362/209; 362/266; 362/276
[58] Field of Search .............................. 431/100, 18, 62,
431/60, 6, 255; 362/266, 209, 276; 137/78.4;
251/117, 129.14

[56] References Cited

U.S. PATENT DOCUMENTS

| | | | |
|---|---|---|---|
| 204,826 | 6/1878 | Jacques | 251/129.21 X |
| 602,696 | 4/1898 | Chateau | 251/129.14 X |
| 613,990 | 11/1898 | Guyenot | 251/129.14 X |
| 835,946 | 11/1906 | Giorgi | 251/129.21 X |
| 1,268,913 | 6/1918 | Bair et al. | 251/129.21 |
| 1,630,212 | 5/1927 | Overton | 251/117 |
| 1,631,109 | 5/1927 | Hitzemann | 251/117 X |
| 2,703,582 | 3/1955 | Stepanian | 251/117 X |
| 3,188,836 | 6/1965 | Kniebes | 67/119 |
| 3,248,058 | 4/1966 | Remick, Jr. et al. | 251/129.14 X |
| 3,330,133 | 7/1967 | Kniebes | 67/119 |
| 3,632,283 | 1/1972 | Kniebes | 431/60 |
| 3,723,045 | 3/1973 | Reese | 431/18 |
| 3,829,060 | 8/1974 | von Lewis | 251/129 |
| 4,028,097 | 6/1977 | Strunz et al. | 431/355 |
| 4,349,042 | 9/1982 | Shimizu | 137/78.4 X |
| 4,760,954 | 8/1988 | Hanson | 236/42 |
| 4,830,606 | 5/1989 | Dillinger | 431/255 |
| 4,867,191 | 9/1989 | Walters | 137/78 |

FOREIGN PATENT DOCUMENTS

| | | | |
|---|---|---|---|
| 0922188 | 6/1947 | France | 251/129.14 |
| 2125002 | 4/1972 | Germany . | |
| 56-167973 | 12/1981 | Japan . | |
| 58-217877 | 12/1983 | Japan . | |

*Primary Examiner*—Carl D. Price
*Attorney, Agent, or Firm*—Quarles & Brady

[57] ABSTRACT

A dimmer device for a gas light which is solar activated and is composed of a minimum number of parts. A magnetically operated valve with a magnetically attractable ball is energized during daylight hours to close off one passageway yet allows gas to flow through a second passageway at a lower flow rate to provide a dimmer condition for the lamp. At night time, the magnetic valve is deactivated causing the magnetically attractable ball to open the otherwise closed passageway and thereby allow full gas flow to the lamp. The dimmer device is easily installed into the lamp housing rather than the post.

20 Claims, 1 Drawing Sheet

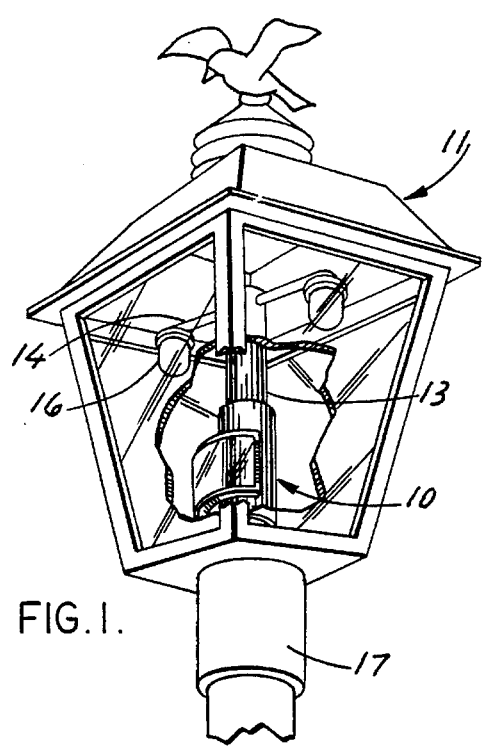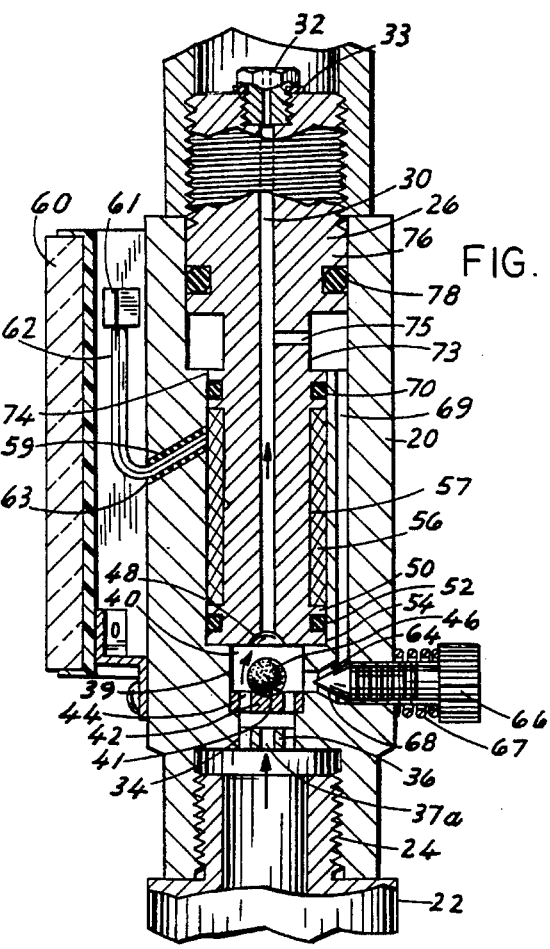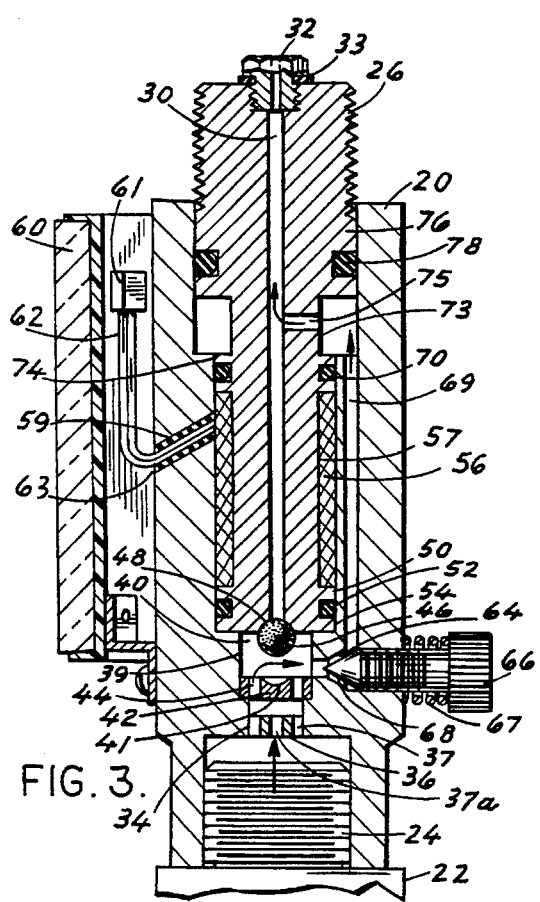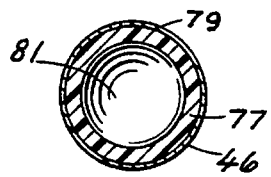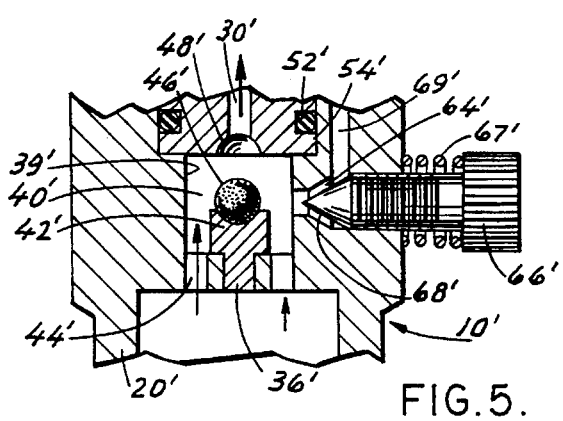

GAS LIGHT CONTROL APPARATUS

BACKGROUND OF THE INVENTION

This invention relates to a gas light control apparatus. More particularly, it relates to a dimmer device for a gas light which is simple in its construction and can be activated by a solar cell.

The use of solar cells to activate dimmer devices to conserve energy during daylight hours for gas lamps is well known. For example, in U.S. Pat. No. 4,867,191 there is disclosed a solar activated electromagnetic valve 33 having a controlled shut-off plunger 53 for closing and opening a passageway 51 to control a main gas supply to a gas lamp. The magnetic valve 33 is energized by a solar cell 57. A bypass gas line 61 with a collar 67 and a set screw 69 is also provided to effect a dimmer capacity.

U.S. Pat. Nos. 3,188,836; 3,330,133; and 3,632,283 also illustrate photocell activated dimmer devices for gas lights. These employ either a galvanometer such as designed at 74 in the '836 patent or at 28 in the '133 patent. In the '283 patent, a similar type of arrangement is provided by a permanent magnet and a coil armature with a movable arm 90 having a closure portion 94.

U.S. Pat. No. 4,830,606 also discloses a photocell 34 for activating an electromagnetic gas valve 14. However, there is no detailed description of the valve.

All of the previously mentioned patents which describe solar or photocell activated electromagnetic valves, employ valves which are multicomponent. These are costly to manufacture. Also all of the previously referred to valves are installed into a lamp post. This also adds additional cost. Accordingly, there is a need for a more simplified solar cell activated valve for use as a dimmer device. There is also needed a dimmer device which can be more easily installed in a gas lamp.

It is therefore an advantage of the present invention to provide a dimmer device for a gas lamp which can be manufactured from few parts and thus less cost.

It is another advantage of the present invention to provide a dimmer device of the foregoing kind which can be activated by solar energy and with minimum energy requirements.

It is still another advantage of the present invention to provide a dimmer device of the foregoing kind which can be easily installed in a lamp housing.

SUMMARY OF THE INVENTION

The foregoing advantages are accomplished by the present gas light control apparatus for effecting a dimming of the gas light under selected conditions. A body member is adapted to be connected to a gas intake conduit of a gas lamp. First and second passageways extend through the body member, each having a gas input end and an output end. A magnetically attractable ball member is operatively positioned to open and close the gas input end of one of the first and second passageways. Magnetic means are operatively associated with the magnetically attractable ball member to magnetically attract the ball member to a position to close one of the first and second passageways. A solar cell is connected to the magnetic means.

In a preferred embodiment, the magnetic means includes an armature and coil member with one of the passageways extending through the armature.

In yet another preferred embodiment, one of the passageways includes a concave valve seat at the gas input end for the magnetically attractable ball member, and the magnetic ball is a hollow plastic ball coated with a magnetically attractable material.

In one aspect, the body member and solar cell are housed inside the gas lamp housing.

BRIEF DESCRIPTION OF THE DRAWINGS

A better understanding of the present gas light dimmer will be accomplished by reference to the drawing wherein:

FIG. 1 is a perspective view of the gas light dimmer illustrated in conjunction with a gas lamp.

FIG. 2 is a view in vertical section of the dimmer in a fully lighted mode.

FIG. 3 is a view similar to FIG. 2 showing the dimmer in a partially closed or dimmer mode.

FIG. 4 is a sectional view of the magnetically attractable ball for use in the dimmer.

FIG. 5 is an enlarged partial view of an alternative embodiment.

DESCRIPTION OF THE EMBODIMENTS

With respect to FIGS. 1, 2 and 3, the gas light control apparatus or dimmer generally 10 is shown in conjunction with a gas lamp generally 11 having the usual gas lamp burner provided by the venturi tube 13 connected to cross arms 14 with the standard mantles 16. A post 17 supports the gas lamp illuminating housing 11 and has therein a gas intake pipe 22 with external threads 24 for connection to body member 20. A central passageway 30 extends through body member 20 terminating in an orifice 32 with seal 33 for supplying gas to venturi tube 13. An armature member 26 is accommodated inside body member 20 and has the passageway 30 therein.

Referring specifically to FIGS. 2 and 3, the body member 20 has a first bore 34 in which is placed an insert 36 with apertures 37 to distribute the inflow of gas which passes through seat member 42 placed in bore 39 and having apertures 44. The seat member 42 has a concave seat 41 to accommodate the magnetically attractable ball 46. A compartment 40 for ball 46 is provided between the seat member 42 and the end of the armature 26 which also has a seat 48. Armature 26 is sealed in a larger bore 54 of the body member 20 by the seal 52 in the diameter portion 50. Larger bore 54 accommodates a coil 56 which is wound around a smaller diameter portion 57 of the armature 26. This coil is connected to a solar cell 60 by the wires 62 and the connection 61 and are accommodated through the body member 20 by the passage 63 which is sealed by the seal 59.

Referring back to ball compartment 40, a passage 64, having a partial conical configuration, is positioned laterally from the compartment 40. An adjustment screw 66, having a conical end 68, is threadably positioned through the body member 20 and has a spring 67 for tensioning purposes. A passageway 69 extends upwardly from passage 64 and is in communication with passage 75 formed by the reduced diameter section 73 in the armature 26. A seal 70 is placed in diameter portion 74, as well as in portion 76, as shown at 78.

Referring to FIG. 4, there is shown in detail the magnetically attractable ball 46. It is formed with a plastic body 77 and a hollow core 81. Surrounding the plastic body is an electromagnetically attractable coating 79 which would contain particles of an electromagnetically attractable material such as iron fillings. It will be appreciated that the weight of the ball 46 would be such as to be attractable to the seat 48 in the armature 26 when current flows through the coil 56. This is illustrated in FIG. 3.

An alternative embodiment 10' is shown in FIG. 5 wherein the same or similar components are designated by the same number except they are primed. Embodiment 10' differs from embodiment 10 in that there is a different valve seat arrangement as indicated by seat member 42'. It is formed as a part of insert 36' which will have the apertures 44' but without a central aperture such as indicated at 37a in the embodiment 10.

OPERATION

A better understanding of the advantages of the gas light dimmer 10 and 10' will be had by description of the use of dimmer 10. Referring to FIGS. 2 and 3, FIG. 2 shows the light dimmer in a fully open position such as would be effected during a night time operation when there are no rays from the sun and there is no current flowing from the solar cell 60 and to the coil 56. There it is seen that the ball 46 is resting on seat member 42. In this position, gas can flow through apertures 37 and 37a as well as apertures 44 and into compartment 40. From there gas flows upwardly through passageway 30 to orifice 32, as well as into passage 64 and passageway 69. The flow of gas from passageway 69 is through the reduced diameter section 73 and passage 75 to orifice 32.

During the day time, when sunlight and rays of light from the sun contact the solar cell 60, this causes a flow of current through the wires 62 which activates the coil 56. This flow of current effects a magnetic field in the armature 26 to cause the ball 46 to rise from seat 41 of member 42 to seat 48. This is the condition as shown in FIG. 3. In this position, ball 46 blocks the flow of gas through the main passageway 30. Gas flows only through passages 64, passageway 69 and passage 75 where it enters passageway 30. This reduction in gas flow will cause a dimming of the light from the mantles 16. Regulation of flow is effected by the screw 66 which acts as a needle valve in controlling the flow of gas through the passage 64.

The operation of dimmer 10' is substantially the same as for dimmer 10 except for the flow of gas past the seat member 42'.

An important feature of the invention is the magnetically attractable ball 46. As indicated previously, it must be constructed of a material which is light enough to respond to the current flow through the coil 56 and seat on seat 48 yet provide a proper seating on the seat 41 of seat member 42 so as to be in alignment with the valve seat member 48. Various plastic materials can be utilized for this purpose such as nylon and various electromagnetically attractable metals can be used on or in the body of the plastic ball. Such metals could include the previously mentioned iron, as well as steel, cobalt and nickel. Cobalt and nickel could be alloyed with iron and steel as could cerium, chromium, molybdenum, silicon, thorium, titanium, tungsten, aluminum and aresenic. Alternatively, a hollow steel ball could be employed if light enough. Aluminum is the preferred material for composing body member 20.

It will thus be seen that through the present invention there is now provided a simplified dimming device which can automatically control the dimming action of a gas light by the use of few parts which are easily assembled. An additional advantage of the present dimmer is the fact that it can be easily connected inside the gas lamp 11 and obviates removal of the gas lamp 11 and opening up of the post. This advantage is seen by the connection of the venturi tube 13 to the gas light dimmer 10 in the gas lamp housing. Flat sections 36 and 38 are disposed on body member 20 to accommodate a tool for this purpose.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A gas light control apparatus for effecting a dimming of the gas light under selected conditions comprising:

a body member adapted to be connected to a gas intake conduit of a gas lamp;

first and second passageways extending through said body member each having a gas input end and an output end;

a magnetically attractable ball member operatively positioned to open and close said gas input end of one of said first and second passageways, said magnetically attractable ball member composed of a plastic material having magnetically attractable metal carried by said plastic material;

magnetic means operatively associated with said ball member to magnetically attract said ball member to a position to close one of said first and second passageways; and a solar cell connected to said magnetic means, said ball member being magnetically attractable to said magnetic means by current supplied solely by said solar cell.

2. The control apparatus of claim 1 wherein the magnetic means includes an armature and coil member with one of said passageways extending through said armature.

3. The control apparatus of claim 2 wherein one of said passageways includes a concave valve seat at said gas input end for said magnetically attractable ball member.

4. The control apparatus of claim 1 wherein said magnetically attractable ball member is defined by a hollow plastic ball coated with said magnetically attractable metal.

5. The control apparatus of claim 4 wherein the magnetically attractable metal is discrete particles of iron.

6. The control apparatus of claim 1 wherein said magnetically attractable ball member is housed in a compartment providing a common inlet for said first and second passageways.

7. The control apparatus of claim 6 wherein one of said passageways is disposed in a substantially U-shaped manner with respect to the other to provide a bypass channel.

8. The control apparatus of claim 7 further including screw adjustment means for regulating gas flow in said bypass channel.

9. The control apparatus of claim 6 wherein said compartment includes at least two gas intake conduits into said compartment.

10. The control apparatus of claim 1 wherein said body member is adapted to be connected to the inside of a gas lamp illuminating housing.

11. A gas light control apparatus for effecting a dimming of the gas light under selected conditions comprising:

a body member having one end adapted to be connected to a gas intake conduit inside a gas lamp illuminating housing and the other end adapted to be connected to a gas lamp burner;

first and second passageways extending through said body member each having a gas input end and an output end;

a magnetically attractable ball member operatively positioned to open and close said gas input end of one of said first and second passageways, said magnetically attractable ball member composed of a plastic material having magnetically attractable metal carried by said plastic material;

magnetic means operatively associated with said ball member to magnetically attract said ball member to a position to close one of said first and second passageways; and a solar cell connected to said magnetic means, said ball member being magnetically attractable to said magnetic means by current supplied solely by said solar cell.

12. The control apparatus of claim 11 wherein said solar cell is connected to said body member.

13. The control apparatus of claim 11 wherein said body member includes flat side portions for engagement by a tool.

14. The control apparatus of claim 11 wherein said body member is connected to said intake conduit and to said gas lamp burner by screw threads.

15. The control apparatus of claim 11 wherein said body member is composed of aluminum.

16. The control apparatus of claim 11 wherein said magnetic means includes an armature and a coil with one of said passageways extending throughout said armature.

17. The control apparatus of claim 11 wherein said passageway extending through said armature is centrally positioned.

18. The control apparatus of claim 16 wherein said body member includes a hollow bore for receiving said armature.

19. The control apparatus of claim 17 wherein the armature includes a reduced diameter section to provide in part a portion of one of said first and second passageways.

20. The control apparatus of claim 19 wherein said reduced diameter section provides in part a portion of one of said first and second passageways other than one closed by said magnetically attractable ball member, said one passageway being a bypass passageway.

* * * * *